United States Patent
Watson (10) Patent No.: US 7,624,102 B2
(45) Date of Patent: Nov. 24, 2009

(54) SYSTEM AND METHOD FOR GROUPING BY ATTRIBUTE

(75) Inventor: Eric B. Watson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 209 days.

(21) Appl. No.: 11/044,289

(22) Filed: Jan. 28, 2005

(65) Prior Publication Data

US 2006/0173819 A1  Aug. 3, 2006

(51) Int. Cl.
*G06F 7/00* (2006.01)

(52) U.S. Cl. .................... 707/4; 707/5; 707/10; 705/27

(58) Field of Classification Search .................. 707/2–6, 707/7, 10, 102; 705/1, 10, 26, 27; 715/526, 715/700, 738, 744
See application file for complete search history.

(56) References Cited

U.S. PATENT DOCUMENTS

| | | | | |
|---|---|---|---|---|
| 6,029,141 | A * | 2/2000 | Bezos et al. | 705/27 |
| 6,728,706 | B2 * | 4/2004 | Aggarwal et al. | 707/5 |
| 6,785,671 | B1 * | 8/2004 | Bailey et al. | 707/3 |
| 7,031,961 | B2 * | 4/2006 | Pitkow et al. | 707/4 |
| 7,165,119 | B2 * | 1/2007 | Fish | 709/246 |
| 2003/0172004 | A1 * | 9/2003 | Anderson | 705/27 |
| 2003/0195877 | A1 * | 10/2003 | Ford et al. | 707/3 |
| 2004/0205065 | A1 * | 10/2004 | Petras et al. | 707/5 |
| 2005/0027612 | A1 * | 2/2005 | Walker et al. | 705/26 |
| 2005/0096997 | A1 * | 5/2005 | Jain et al. | 705/26 |
| 2006/0004713 | A1 * | 1/2006 | Korte et al. | 707/3 |
| 2006/0129446 | A1 * | 6/2006 | Ruhl et al. | 705/10 |
| 2006/0143158 | A1 * | 6/2006 | Ruhl et al. | 707/3 |

OTHER PUBLICATIONS

Parker et al., Video Blogging: Content to the Max, Multimedia, IEEE vol. 12, Issue 2, Apr.-Jun. 2005, pp. 4-8.*
Pang-Ning Tan et al., "Ordering Patterns by Combining Opinions from Multiple Sources", Department of Computer Science and Engineering Michigan State University—Research Track Poster, Aug. 22-25, 2004.

* cited by examiner

*Primary Examiner*—Greta L Robinson
(74) *Attorney, Agent, or Firm*—Shook, Hardy & Bacon LLP (57) ABSTRACT

A system and method are provided for implementing a search engine to produce search results grouped by attribute. The system may include an attribute indexing component for indexing available resources with reference to selected attributes in a search engine index. The system may additionally include a grouping component for grouping search results produced by the search engine into at least two attribute groups in accordance with the indexed selected attributes. The system may further include an attribute display component for displaying information pertaining to the selected attributes within each relevant available resource.

19 Claims, 5 Drawing Sheets

SYSTEM AND METHOD FOR GROUPING BY ATTRIBUTE

CROSS-REFERENCE TO RELATED APPLICATIONS

None.

STATEMENT REGARDING FEDERALLY SPONSORED RESEARCH OR DEVELOPMENT

None.

TECHNICAL FIELD

Embodiments of the present invention relate to a technique for grouping search results produced by a search engine. In particular, embodiments of the invention relate to grouping search results by attribute or logical category.

BACKGROUND OF THE INVENTION

Through the Internet and other networks, users have gained access to large amounts of information distributed over a large number of computers. In order to access the vast amounts of information, users typically implement a user browser to access a search engine. The search engine responds to an input user query by returning one or more sources of information available over the Internet or other network.

Currently, when implementing a search engine, a user enters one or more keywords and receives a set of results. Depending upon the particular terms entered by a user, the search engine produces a particular number of results. During its search, the search engine typically implements a crawler to access a plurality of websites and stores references to those websites in an index. The references in the index may be categorized based on one or more keywords. When responding to a user query, the search engine may first traverse the index in order to locate the input query terms. Typically, the search engine displays the results in an order based on perceived relevance.

For the user, evaluating and sorting though the results returned can be an extremely arduous task, particularly as the number of results increases. The relevance as determined by the search engine may not adequately address a user's query. For instance, a user may enter a query including the name of a particular product. The search engine does not know whether the user is looking for information about the product, feedback on the product, or for the opportunity to purchase the product over the Internet. Users may simply want to know whether those who have purchased a product have a positive opinion of the product. In such cases, users typically must visit multiple sites and waste time determining which results contain desirable information.

Although web sites are available that collect opinions, these websites often fail to provide the user with desired information in an efficient manner. Furthermore, these websites do not gather information from all possible sources available over the network. Rather, these websites frequently link to other sites rather than providing all necessary information in one location. Furthermore, prior research exists that enables creation of a list of attributes and subsequent classification of documents based on the list contents. However, this technology has not been implemented for grouping web sites by attribute based on search engine traversal. Accordingly, a solution is needed that groups results by useful attributes based on a query type. Furthermore, a solution is needed that will enable users to view positive and negative attributes of a product are service as evaluated by other users.

BRIEF SUMMARY OF THE INVENTION

Embodiments of the present invention are directed to a method for implementing a search engine to produce search results grouped by attribute. The method includes utilizing an index that includes indexed selected attributes of available resources. The method additionally includes determining if a user input query seeks information related to the indexed selected attributes and upon determination that the user query seeks information related to the indexed selected attributes, grouping search results into at least two groups based on the indexed selected attributes.

In an additional aspect, a method is provided for implementing a search engine to produce search results grouped by attribute. The method includes indexing available resources within a search engine index with reference to selected attributes. The method additionally includes grouping search results produced by the search engine into at least two attribute groups in accordance with the indexed selected attributes. The method also includes displaying as a portion of displayed search results, information pertaining to the selected attributes within each relevant available resource.

In yet a further aspect, a system is provided for implementing a search engine to produce search results grouped by attribute. The system includes an attribute indexing component for indexing available resources with reference to selected attributes in a search engine index. The system additionally includes a grouping component for grouping search results produced by the search engine into at least two attribute groups in accordance with the indexed selected attributes. The system may also include an attribute display component for displaying information pertaining to the selected attributes within each relevant available resource.

BRIEF DESCRIPTION OF THE DRAWINGS

The present invention is described in detail below with reference to the attached drawings figures, wherein.

DETAILED DESCRIPTION OF THE INVENTION

I. System Overview

Embodiments of the invention are directed to a system and method for improving presentation of search results by grouping query results in logical categories such as by useful attribute. For example, embodiments of the invention may display a number of web sites including positive opinions about a searched item and a number of web sites including negative opinions relating to the searched item. In this instance, the attribute or logical category is the positive opinion or negative opinion. As another example, the attribute may be a "location" attribute. In this instance, results may be grouped by one or more locations. Furthermore, embodiments of the invention include providing a summary report of pre-computed statistics in association with each attribute.

Embodiments of the invention also address display of results to indicate more specific attribute information. For example, if positive and negative opinion attributes are selected, users may be provided with information pertaining to what people liked about a product or service and what people did not like about the product or service. As will be further explained below, attributes such as positive and negative comments may be pre-calculated in a search engine index. A mechanism may be included for summing the indexed items by attribute.

Figure 1:
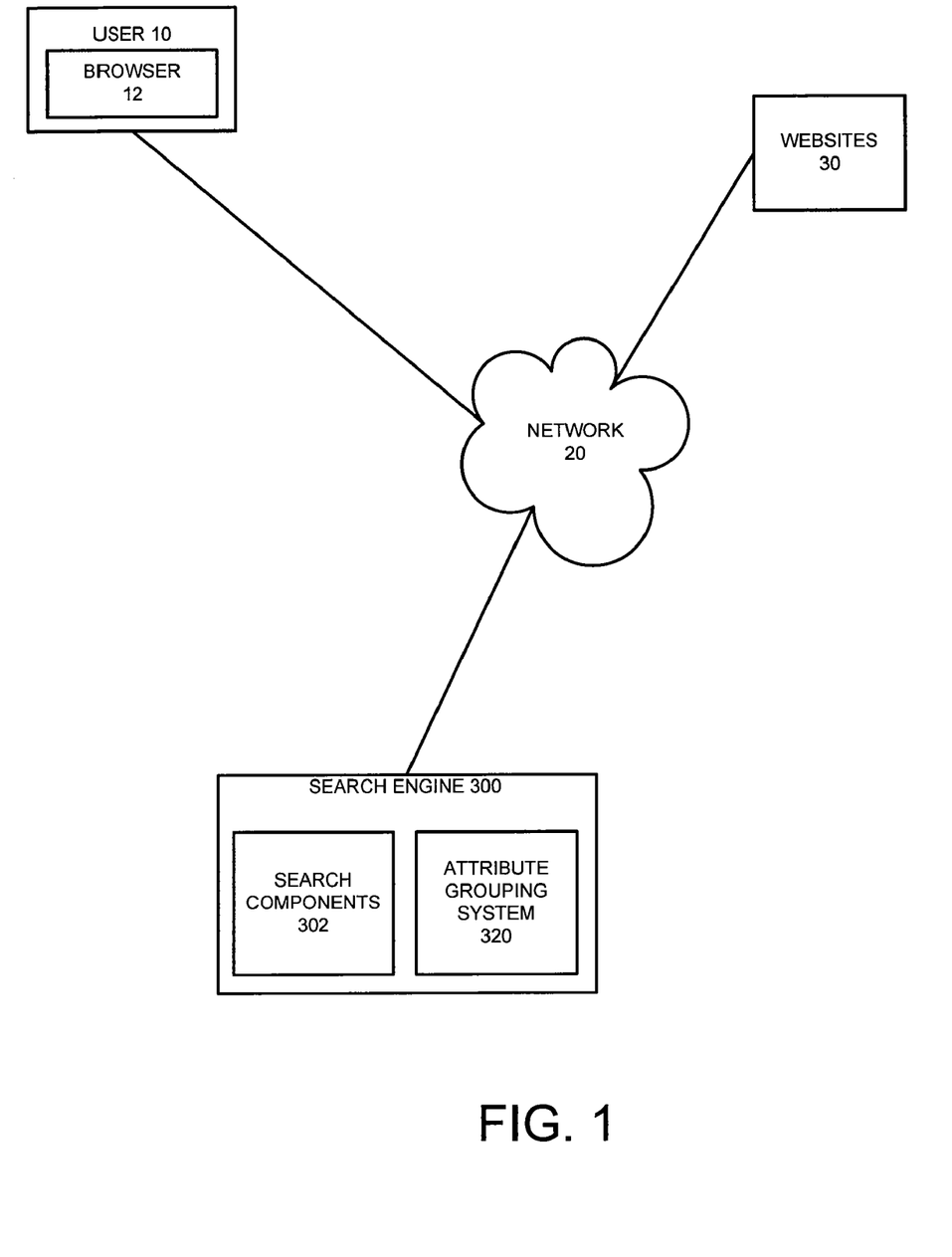
FIG. 1 is a block diagram illustrating an overview of a system in accordance with an embodiment of the invention.

FIG. 1 is a block diagram illustrating a system overview in accordance with embodiments of the invention. A search engine 300 including search components 302 and an attribute grouping system 320 may be connected over a network 20 with one or more user computers 10. Each user computer 10 may include a browser 12. Large numbers of websites 30 may also be connected over the network 20 with the search engine 300 and the user computer 10.

II. Exemplary Operating Environment

Figure 2:
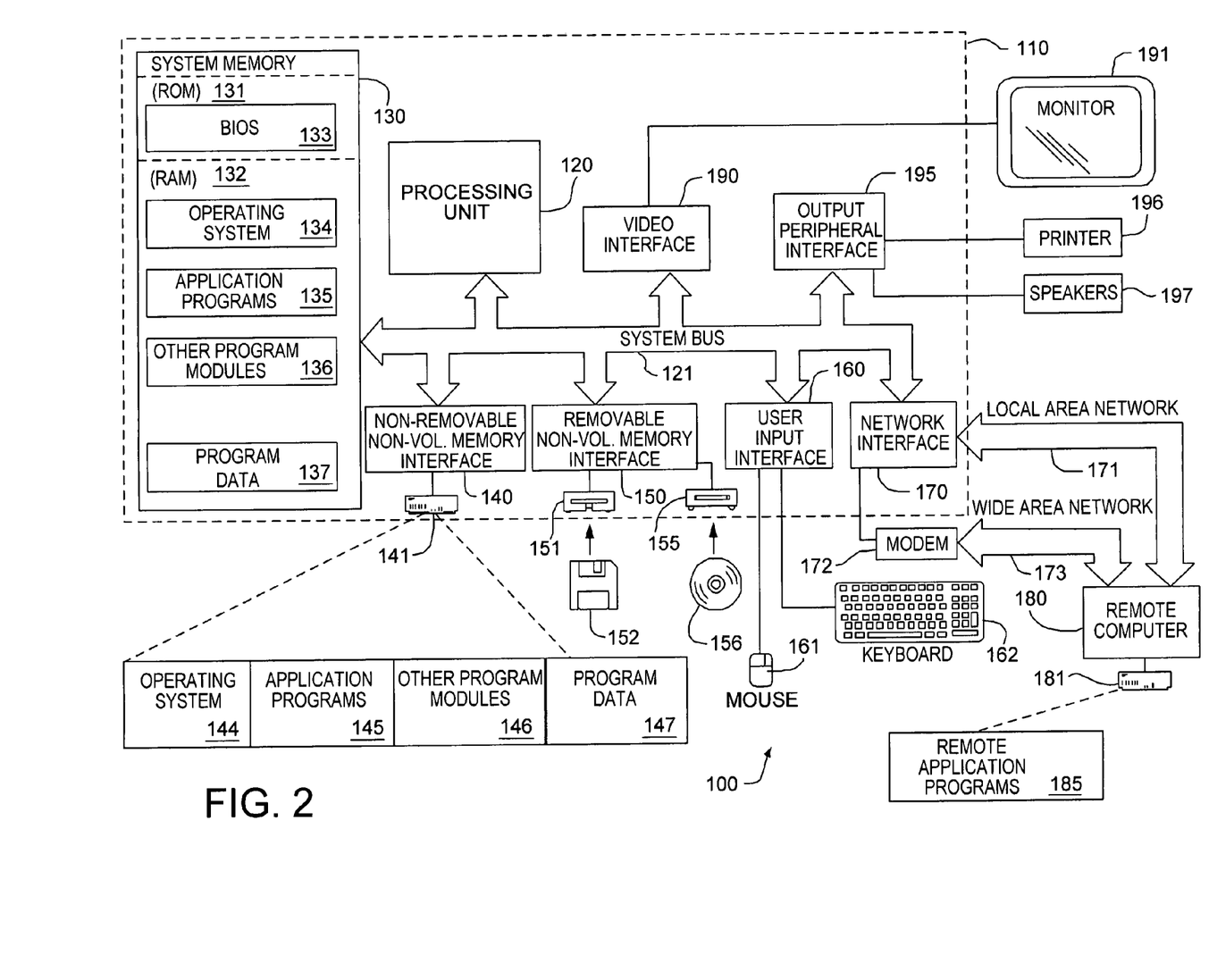
FIG. 2 is a block diagram illustrating a computerized environment in which embodiments of the invention may be implemented.

FIG. 2 illustrates an example of a suitable computing system environment 100 on which the system and method for grouping by attribute may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 2, the exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or non-volatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

III. System and Method of the Invention

As set forth above, FIG. 1 is a block diagram illustrating a system overview in accordance with embodiments of the invention. User computers, such as the user computer 10 that includes a user browser 12, may be connected over the network 20 with the search engine 300. The network 20 may be the Internet or alternatively any of the types of networks described above with reference to FIG. 2.

Figure 3:
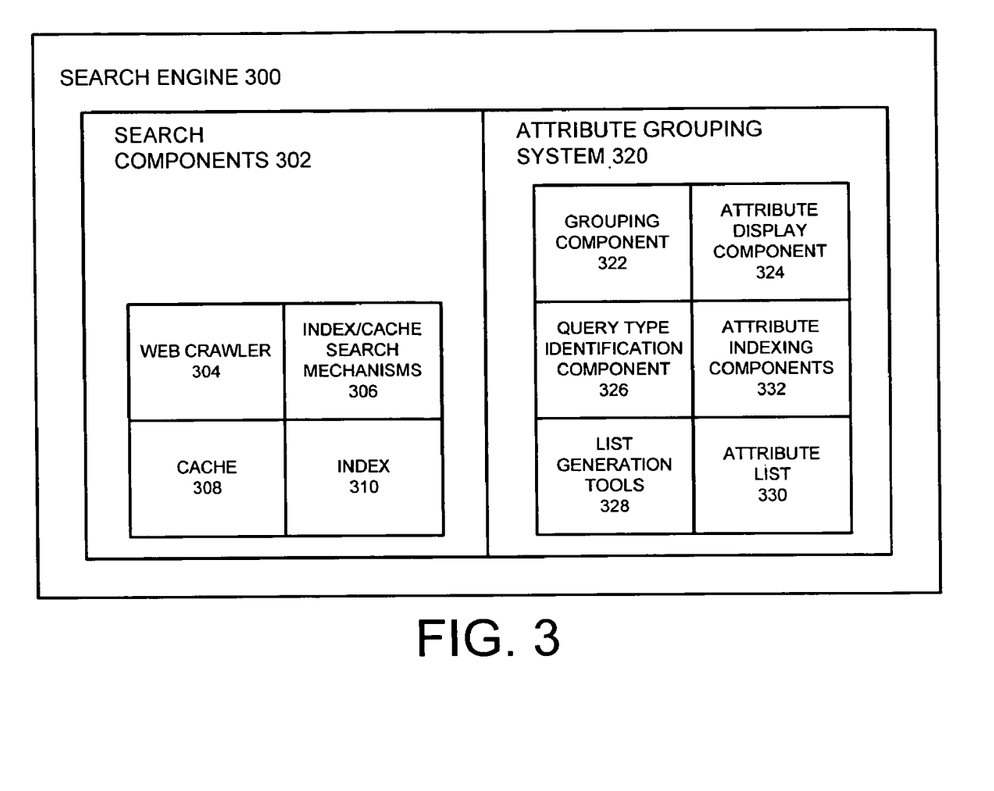
FIG. 3 is a block diagram illustrating components of a search engine in accordance with an embodiment of the invention.

As illustrated in FIG. 3, the search engine 300 may include search components 302 and the attribute grouping system 320. The search components 302 may include additional components that are not shown and may not necessarily include all of the components shown. However, as illustrated, the search components 302 may contain a web crawler 304, an index/cache search mechanism 306, a cache 308, and an index 310. The web crawler 304 typically traverses websites 30 on a regular basis and indexes the websites 30 in the index 310 in order to easily access results in response to a user input query. Upon query processing, the index/cache search mechanism 306 may search the index 310 for matches and the cache 308 for cached results.

The attribute grouping system 320 may include a grouping component 322, an attribute display component 324, a query type identification component 326, attribute indexing components 332, list generation tools 328, and an attribute list 330.

The list generation tools 328 may generate an initial list of attribute terms, such as positive and negative terms. The list generation tools 328 may include an algorithm for generating the attribute list 330. Exhaustive lists of attributes, such as positive and negative terms, can be generated in several ways. One technique may involve taking a small human produced seed set and supplementing it with a dictionary and/or thesaurus. An algorithm may assume that all synonyms with words in the set have the same orientation and all antonyms have the opposite orientation. The list generation tools 328 may further include a mechanism for analysis of text on each page to identify orientation switchers such as "but" or "not" within close proximity to opinion words. Other ways of identifying attributes, such as positive/negative orientation, could include natural language processing to more accurately identify opinion parts of sentence.

Attribute indexing components 322 may operate in conjunction with the web crawler 304 and index 310 to appropriately index visited information based on its attribute characteristics. The attribute indexing components 332 may analyze text based on a comparison with the attribute list 330. For instance, if the attribute list 330 contains terms viewed as positive and terms considered to be negative, the attribute indexing components will look for those terms in the websites visited by the web crawler 304 and provide an appropriate notation in the index 310. For example, in the case of positive and negative comments, the attribute indexing components 322 may pre-calculate numbers of positive and negative indicators found on a web site and include calculated numbers in the index 310. Thus, the attribute indexing components 322 may identify attributes before runtime by looking for attributes such as positive and negative terms and their relative densities in the relevant documents.

Often, users are likely to seek more information about the attributes than the number of occurrences. The attribute indexing components 322 may also acquire and store additional information that will allow more information to be displayed to the user. For example, if the attributes are positive and negative opinions about a product, the user might want to know the top ten things people liked about the product or the top ten things people disliked about the product. As will be further explained below, the index 310 created for storing these facts allows subsequent display of the various facts about the attributes in addition to the number of attribute indicators found in an indexed website and the indicators themselves.

Figure 4:
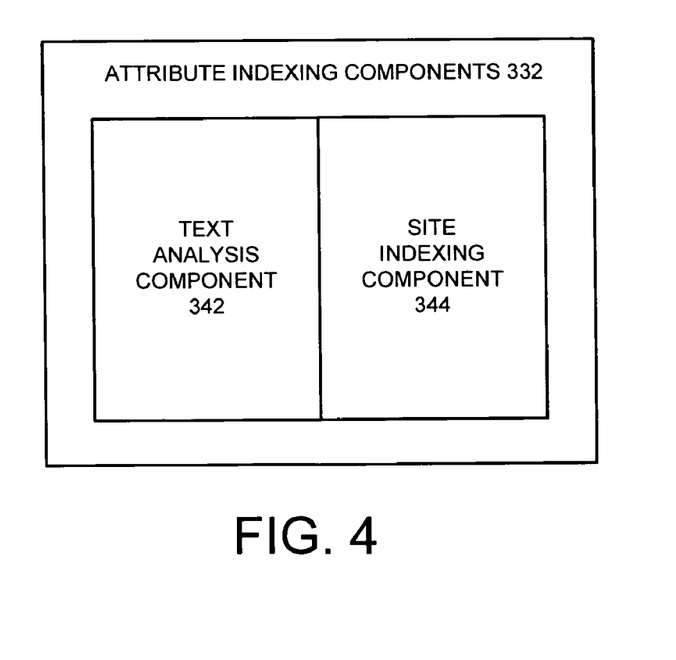
FIG. 4 is a block diagram illustrating attribute indexing components in accordance with an embodiment of the invention.

FIG. 4 illustrates further details of the attribute indexing components 332 in accordance with an embodiment of the invention. The attribute indexing components 332 may include a text analysis component 342 and a site indexing component 344. As set forth above, the text analysis component 342 may operate to analyze text in accordance with the terminology provided in the attribute list 330. Based on the text analysis performed by the text analysis component 342, the site indexing component may modify the index 310.

Returning to FIG. 3, the query type identification component 326 may, upon entry of a user query, determine whether the query seeks attribute information. A positive determination by the query identification component 326 may trigger operation of the grouping component 322 and the attribute display component 324. For example, assuming the attributes are positive and negative opinions on the Internet, opinion oriented content is likely to be found in news groups, online communities, and blogs. The query type identification component 326 may determine a number of results for the input query that are located in a blog, an online community, or newsgroup and based on this number, may determine that the query seeks opinion information or does not seek opinion information. Alternatively, the query type identification component 326 may determine a threshold number or ratio of opinion words located within each result produced. A threshold ratio of non-opinion to opinion related results could be pre-configured. If search results meet conditions pre-set within the query type identification component 326, the grouping component 322 may be activated.

In order to facilitate optimal performance, the query type identification component 326, the grouping component 322, and the attribute display component 324 may be selectively de-activated by a user or by the search engine 300. During peak usage periods, users may prefer improved performance to attribute groupings.

In operation, the grouping component 322, when activated by the query type identification component 326, groups results based on the indexing provided by the attribute indexing components 332 in the index 310. The attribute grouping component 322 may additionally include algorithms for calculating characteristics of the attributes within each available resource. The attribute display component 324 subsequently controls display of the grouped results.

Initially, the attribute display components 324 may display a total number of results that correspond to each attribute. For example, using the opinion example, the attribute display components 324 may display an indicator such as "positive 546/negative 112". The attribute display components 324 may additionally sort and display by the specific positive comment values. Furthermore, since searchers may want to determine what people like about a product or what people do not like, the attribute display components 324 may highlight words indicating the attribute. The attribute display component 324 may highlight negative words such as "slow", "bad", "poor", etc. or positive indicators such as "excellent", "good", "durable", etc. The grouping component 322 and the attribute display components 324 may separately list opinion results grouped by positive and negative.

Figure 5:
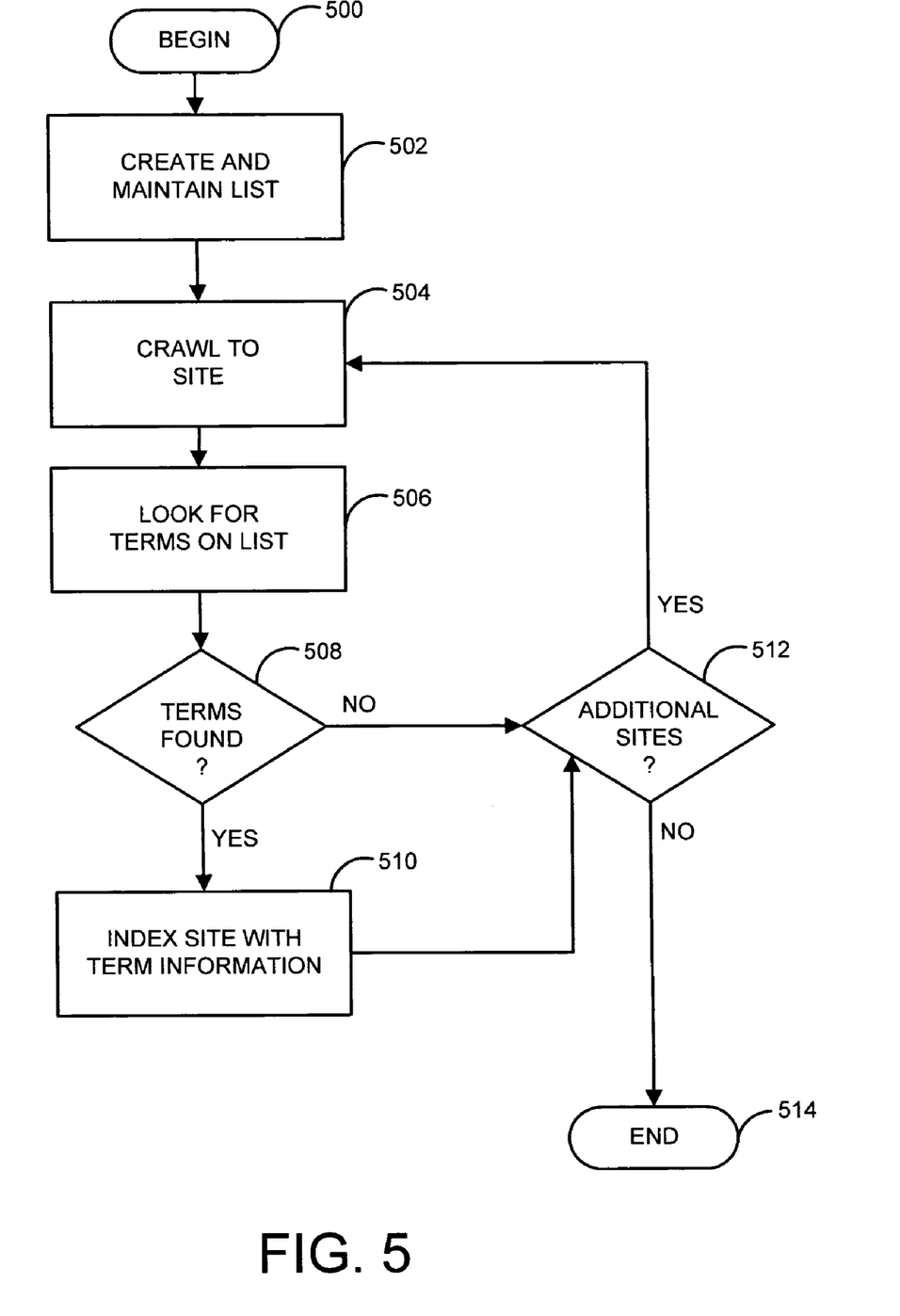
FIG. 5 is a flowchart illustrating a method for indexing by attribute in accordance with an embodiment of the invention.

FIG. 5 is a flowchart illustrating an indexing method in accordance with an embodiment of the invention. The method begins in step 500. In step 502, the list generation tools 328 create and maintain the attribute list 330. In step 504, the web crawler 304 crawls to a web site. In step 506, the attribute indexing components 332 look for terms that are on the attribute list 330. If the terms are found in step 508, the attribute indexing components 332 make an appropriate notation in the index 310 in step 510. If the terms are not found in step 508, the web crawler 304 may repeat the procedure if in step 512, additional sites require indexing. If no additional sites require indexing in step 512, the process ends in step 514.

Figure 6:
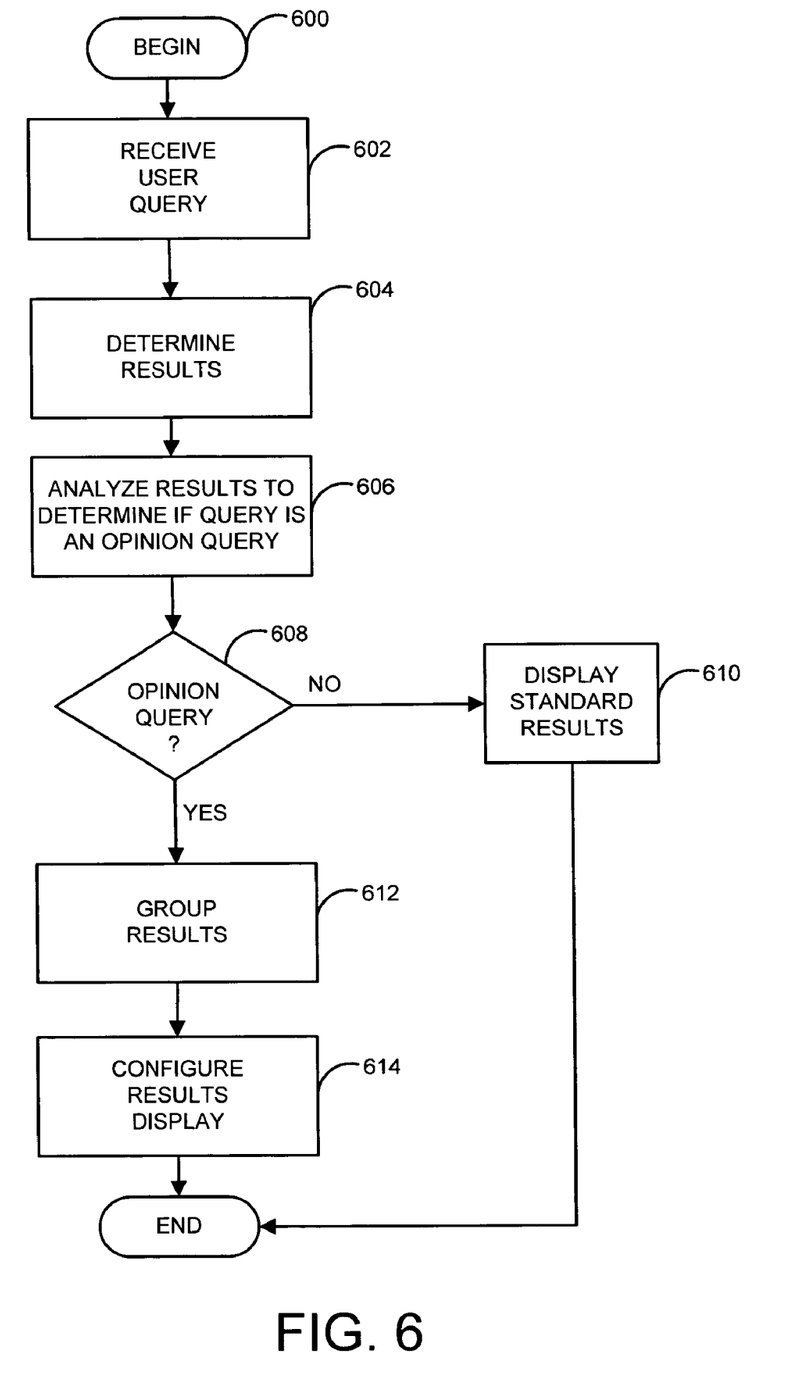
FIG. 6 is a flowchart illustrating a method for grouping results in accordance of an embodiment of the invention.

FIG. 6 illustrates a method for processing a user query in accordance with an embodiment of the invention. In step 600, the search engine 300 receives a user query from the user computer 10. In step 604, the search engine 300 implements its search components 302. In step 606, the search engine 300 analyzes results to determine if a query is an opinion query 606. If in step 608, the query is determined to be an opinion query, the grouping component 322 groups the results in step 612 and the attribute display component 324 configures the results for display in step 614. If the query is not an opinion query, or if the opinion feature is not activated, the search engine 300 displays standard results in step 610. The process ends in step 616.

As an example, if a user enters a query for "digital camera", through the components and methods identified above, the user might receive the following display:

TABLE 1

Search results
. . . other results types . . .
Positive community results for "digital camera" 5,346
    Digital Cameras - Kodak DC280 Digital Camera Review     The DC280 is Kodak's first product in the 2-megapixel category. Fortunately for Kodak, this first step looks like a good one . . . some of the best color we've seen from an under-$1,000 digicam. A sharp, distortion-free lens, and fast, 4-second, shot-to-shot responsiveness . . .
    www.imaging-resource.com/PRODS/DC280/DC280A.HTM
    Owners Opinion: Kodak DC4800: SevenT: Digital Photography Review     . . . Previous. Next > Opinion. I had used a Sony DSC-S70 digital camera at work and wanted something of . . . offer, and despite what one opinion here has stated, I received my . . .
    www.dpreview.com/reviews/read_opinion_text.asp?prodkey=kodak_dc4800&op . . .
    More positive results . . .
Negative community results for "" 332
    Owners Opinion: Nikon Coolpix 775: Peter: Digital Photography Review     . . . Owners Opinion: Nikon Coolpix 775 (Peter, 1 Sep 01) . . . SLR lens picture quality). I got this camera after I spent two weeks doing the research on digital camera market . . .
    www.dpreview.com/reviews/read_opinion_text.asp?prodkey=nikon_cp775&opi . . .
    AnimeMusicVideos.org :: View topic - Looking for a Digital Camera     Search Memberlist Usergroups Register. Profile Log in to check your private messages Log in. Site Home Page Member Main page. Looking for a Digital Camera. AnimeMusicVideos.org Forum Index –> Heads Up! . . . Post subject: Looking for a Digital Camera. We been shopping around for a good digital camera for the past couple months . . . AMV Suggestions. AMV Contests. Opinion Exchange. Heads Up! . . .
    www.animemusicvideos.org/phpBB/viewtopic.php?p=483155&sid=ed8c8db5a177 . . .
More negative results . . .

The display components 324 may provide main search results for generic web sites that are not relevant to the attributes and give the results relevant to the attributes in a grouped format. For example, the results may be grouped as negative and positive community results with an indication of a number of results as illustrated above in Table 1. As illustrated, the positive group may include a size indicator "5,346" of the size of the group of positive results. The negative results may also include a size indicator "332" of the size of the group of negative results as illustrated. These size indicators give users an idea of the prominent attribute, e.g. an indication as to whether the results overall were positive or negative.

Optionally, contextual descriptions could be tuned to highlight the opinion text. As illustrated above, positive opinion words such as "good", "sharp", and "fast" may be highlighted. These positive opinion words may be viewed in this instance as the "attribute indicators". This feature may enable a searcher to drill down on results to view what other users liked about the product rather than simply whether most people had a positive opinion or negative opinion. Although the example provided above relates to a product, the searcher may also be searching a political issue or any type of controversial topic on which others may have an opinion. Further, as stated above, the attribute may be a location, language, or other feature.

Additionally, in order to identify the breakdown of the attributes within the primary attribute grouping, users may be provided with a "Break down by attribute" link as illustrated below in Table 2.

TABLE 2

... other results types ...
Positive community results for "digital camera" 5,346 Break down by Attribute
    Digital Cameras - Kodak DC280 Digital Camera Review     The DC280 is Kodak's first product in the 2-megapixel category. Fortunately for Kodak, this first step looks like a good one ... some of the best color we've seen from an under-$1,000 digicam. A sharp, distortion-free lens, and fast, 4-second, shot-to-shot responsiveness ...
    www.imaging-resource.com/PRODS/DC280/DC280A.HTM
Positive "Digital Camera" attributes
Fast - 4,423 results
    Digital Cameras - Kodak DC280 Digital Camera Review     The DC280 is Kodak's first product in the 2-megapixel category. Fortunately for Kodak, this first step looks like a good one ... some of the best color we've seen from an under-$1,000 digicam. A sharp, distortion-free lens, and fast, 4-second, shot-to-shot responsiveness ...
    www.imaging-resource.com/PRODS/DC280/DC280A.HTM
    [More results like this]
Sharp - 1345 results
    Digital Cameras - Kodak DC280 Digital Camera Review     The DC280 is Kodak's first product in the 2-megapixel category. Fortunately for Kodak, this first step looks like a good one ... some of the best color we've seen from an under-$1,000 digicam. A sharp, distortion-free lens, and fast, 4-second, shot-to-shot responsiveness ...
    www.imaging-resource.com/PRODS/DC280/DC280A.HTM
    [More results like this]
...

As illustrated above in Table 2, the user who input the query may, upon being presented with results grouped by attribute, drill down on the results to determine how many included each attribute indicator. In the above example, the positive attribute includes the attribute indicators "fast" and "sharp". For the attribute indicator "fast", the grouping component 326 located 4,423 results. For the attribute indicator "sharp", the grouping component 326 located 1345 results.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A method for implementing a search engine executed on a computing device to group search results by attribute, the method comprising:

utilizing an index that includes one or more indexed selected attributes related to available resources, the one or more indexed selected attributes being sufficient to classify a set of search results into at least two categories, wherein the one or more indexed selected attributes comprise at least one positive opinion attribute and negative opinion attribute;

receiving a user query at the computing device;

inputting the user query into the search engine;

determining one or more search results related to the user query from the set of search results, wherein the one or more search results are responsive to the user query;

determining that the user query seeks information related to the one or more indexed selected attributes;

grouping the one or more search results into at least two groups based on the one or more indexed selected attributes; and     displaying one or more search results that are grouped, the one or more search results including information pertaining to the one or more indexed selected attributes within the available resources,     wherein the one or more indexed selected attributes include at least one of a positive opinion attribute and a negative opinion attribute, and     wherein the one or more search results are grouped based upon at least one of the positive opinion attribute and the negative opinion attribute.

2. The method of claim 1, further comprising summing a number of resources having a first selected attribute and a number of resources having a second selected attribute and displaying each attribute and each sum.

3. The method of claim 1, further comprising displaying a text snippet with each resource and highlighting at least one attribute indicator in the text snippet.

4. The method of claim 1, further comprising selecting an attribute.

5. The method of claim 1, further comprising implementing an attribute list for use by an indexing component to create the index including the indexed selected attributes.

6. The method of claim 1, further comprising creating an attribute list from selected attribute indicators, synonyms, and antonyms.

7. A method for implementing a search engine executed on a computing device to group search results by attribute, the method comprising:
- calculating at least one of a positive opinion attribute and a negative opinion attribute within a search engine, wherein the at least one positive opinion attribute and negative opinion attribute are related to available resources;
- indexing selected attributes related to the available resources within a search engine index, wherein the selected attributes are sufficient to classify search results into at least two categories, and wherein the selected attributes comprise the at least one positive opinion attribute and negative opinion attribute;
- determining a set of results related to the user query;
- inputting the user query into the search engine;
- determining that the user query seeks information related to the indexed selected attributes;
- grouping search results produced by the search engine into at least two attribute groups in accordance with the indexed selected attributes; and
- displaying as a portion of displayed search results, information pertaining to the selected attributes within available resources,
- wherein the search results are grouped based upon at least one of the positive opinion attribute and the negative opinion attribute.

8. The method of claim 7, further comprising determining if a user input query seeks information related to the indexed selected attributes based on types of resources recovered as search results.

9. The method of claim 7, further comprising summing a number of resources having a first selected attribute and a number of resources having a second selected attribute and displaying each e attribute and each sum.

10. The method of claim 9, further comprising displaying a text snippet with each resource and highlighting at least one attribute indicator in the text snippet.

11. The method of claim 9, further comprising selecting a attribute.

12. The method of claim 7, further comprising implementing an attribute list for use by an indexing component to create the search engine index including selected attributes.

13. The method of claim 7, further comprising creating the attribute list from selected attribute indicators, synonyms, and antonyms.

14. A system, containing instructions on a storage medium, that, when executed, implements a search engine to group search results by attribute, the system comprising:
- an attribute indexing component for indexing available resources with reference to selected attributes in a search engine index, the attributes being sufficient to classify search results into at least two categories;
- a grouping component for grouping search results produced by the search engine into at least two attribute groups in accordance with the indexed selected attributes, wherein the search results are produced in response to receiving a query input into the search engine; and
- an attribute display component for displaying information pertaining to the selected attributes within available resources,
- wherein the attributes include at least one of a positive opinion attribute and a negative opinion attribute, and
- wherein the search results are grouped based upon at least one of the positive opinion attribute and the negative opinion attribute.

15. The system of claim 14, further comprising a query type determination component for determining if a user input query seeks information related to the indexed selected attributes based on types of resources recovered as search results.

16. The system of claim 14, wherein the grouping component includes a mechanism for summing a number of resources having a first selected attribute and a number of resources having a second selected attribute and displaying each attribute and each sum.

17. The system of claim 14, wherein the attribute display component includes a mechanism for displaying a text snippet with each resource and highlighting at least one attribute indicator in the text snippet.

18. The system of claim 14, wherein the attribute indexing component selects an attribute.

19. The system of claim 14, further comprising an attribute list for use by the indexing component to create the index including selected attributes.

* * * * *

UNITED STATES PATENT AND TRADEMARK OFFICE
CERTIFICATE OF CORRECTION

PATENT NO. : 7,624,102 B2  Page 1 of 1
APPLICATION NO. : 11/044289
DATED : November 24, 2009
INVENTOR(S) : Eric B. Watson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 232 days.

Signed and Sealed this

Twenty-sixth Day of October, 2010

David J. Kappos
*Director of the United States Patent and Trademark Office*